United States Patent [19]

Hasegawa et al.

[11] Patent Number: 5,153,645
[45] Date of Patent: Oct. 6, 1992

[54] POSITION INDEXING INDICATORS FOR EDITING AN IMAGE FORMING APPARATUS

[75] Inventors: Hirofumi Hasegawa, Osaka; Kaoru Hashimoto, Amagasaki; Toshikazu Kawaguchi, Osaka, all of Japan

[73] Assignee: Minolta Camera Kabushiki Kaisha, Osaka, Japan

[21] Appl. No.: 507,129

[22] Filed: Apr. 10, 1990

[30] Foreign Application Priority Data

Apr. 11, 1989 [JP] Japan ................ 1-42627[U]

[51] Int. Cl.5 ........................................... G03G 15/04
[52] U.S. Cl. .................................... 355/244; 355/202; 355/328; 358/453
[58] Field of Search .............. 355/75, 202, 218, 230, 355/244, 328, 59; 358/453, 488, 497

[56] References Cited

U.S. PATENT DOCUMENTS

| | | | |
|---|---|---|---|
| 3,914,043 | 10/1975 | McVeigh | 355/244 X |
| 4,240,744 | 12/1980 | Rapp et al. | 355/75 X |
| 4,268,164 | 5/1981 | Yajima et al. | 355/202 X |
| 4,518,999 | 5/1985 | Kurata et al. | 358/488 |
| 4,814,815 | 3/1989 | Shibata et al. | 355/75 X |
| 4,862,216 | 8/1989 | Higashi et al. | 355/218 |
| 5,084,760 | 1/1992 | Hashimoto et al. | 355/202 X |

FOREIGN PATENT DOCUMENTS

| | | | |
|---|---|---|---|
| 2843975 | 4/1979 | Fed. Rep. of Germany | 355/218 |
| 55-89868 | 7/1980 | Japan. | |
| 0172170 | 8/1986 | Japan | 355/218 |

*Primary Examiner*—A. T. Grimley
*Assistant Examiner*—J. E. Barlow, Jr.
*Attorney, Agent, or Firm*—Burns, Doane, Swecker & Mathis

[57] ABSTRACT

A document scanning device includes an index lever for indicating a boundary between a plurality of areas dividing a document on a platen and a photoelectric detector for detecting the position of the boundary. The index lever includes a marker which gives information about the boundary to the detector and a lever which moves the marker between a detectable position where the detector can detect the marker and a non-detectable position where the detector cannot detect the marker. The document scanning device is effective to be applied to a copying machine equipped with an editing function of the document.

15 Claims, 10 Drawing Sheets

POSITION INDEXING INDICATORS FOR EDITING AN IMAGE FORMING APPARATUS

BACKGROUND OF THE INVENTION

1. Field of the Invention

The present invention relates to a document scanning device installed in an image processing unit such as a copying machine for use in editing an image of a document.

2. Description of Related Art

Japanese Patent Application Laid-Open No. 55-89868 discloses a copying machine which is designed to easily extract and edit a necessary column from a document with a plurality of columns, for example, a list of customers' addresses. On the other hand, a copying machine disclosed in U.S. Pat. No. 4,862,216 can form an image at an area in a sub-scanning direction of a document with a color different from ones at the other areas.

These prior art copying machines are arranged to indicate a boundary between a necessary area and an unnecessary area of the image, or a boundary between image colors in the sub-scanning direction of the document. And, for indicating the boundary, a position indicating lever is provided frontwardly of a document platen in a movable manner in the sub-scanning direction of the document. The position indicating lever is of a structure, for example, described below, although various types of structures are proposed. Specifically, a white tape or the like is attached to an area where the image of the document is not read on the lower surface of a document platen glass in the sub-scanning direction, with a black lever provided below the tape. In the structure described above, the difference in reflectivity between the tape and the lever is read during the sub-scanning of the document image with the use of a part of a CCD line sensor provided for reading the document image, whereby a position indicated by the lever is recognized.

It is therefore more convenient to edit the document if the position indicating levers are provided as many as possible in the copying machine of the above-discussed structure, so that the boundary can be indicated at many points or positions.

When a list of addresses is to be copied, it hardly takes place that a constant number of necessary and unnecessary areas are always desired. In the case where a small number of areas are desired, levers not to be used amount to a lot, which should not be detected. Therefore, a retreat is arranged in the prior art copying machine such that the levers not in use are prevented from being detected, as a non-detecting area at an end of a moving area of the levers into which the unnecessary levers are accommodated. Because of the retreat it becomes impossible to use the overall area in a reading width in the sub-scanning direction of the document platen for indication by the position indicating levers. Or, the retreat necessitates an increase of the width of the copying machine in the sub-scanning direction.

Moreover, in the event that many areas of the document are to be copied after only a small number of areas thereof are edited and copied, the corresponding necessary number of levers should be taken out again from the retreat, resulting in a great trouble. And, it considerably lowers the efficiency that even the frequently-desired area is necessary to be selected at every requirement.

SUMMARY OF THE INVENTION

The present invention has been developed with a view to substantially eliminating the above-mentioned problems inherent in the prior art copying machines equipped with a scanning device.

An essential object of the present invention is to provide an improved document scanning device whereby an area to be detected and an area not to be detected of a document can be easily set in a simple structure.

Another object of the present invention is to provide an improved document scanning device which does not required a position indicating lever to be frequently taken in and out from a retreat.

A further object of the present invention is to provide an improved document scanning device which can dispense with a retreat, thereby hence being rendered compact in size as a whole.

A document scanning device according to the present invention comprises index means for indicating a boundary of areas dividing a document on a platen and detecting means for optically detecting the position of the boundary. The index means includes a member to be detected by the detecting means and a switching member which switches the member to be detected between a detectable state wherein the latter is able to be detected by the detecting means and a non-detectable state wherein it is not able to be detected by the detecting means. The position where the member to be detected is brought into the detectable state is detected as a boundary between areas.

The member to be detected is switched between the detectable state and the non-detectable state by the switching member in various kinds of manners. For example, the switching member is switched thereby to move the member to be detected in a movable manner to and from an optical path of detecting means. Or, the member to be detected may be concealed from the detecting means when in the non-detectable state.

The above and further objects and features of the invention will more fully be apparent from the following detailed description with accompanying drawings.

DESCRIPTION OF THE PREFERRED EMBODIMENTS

Figure 1:
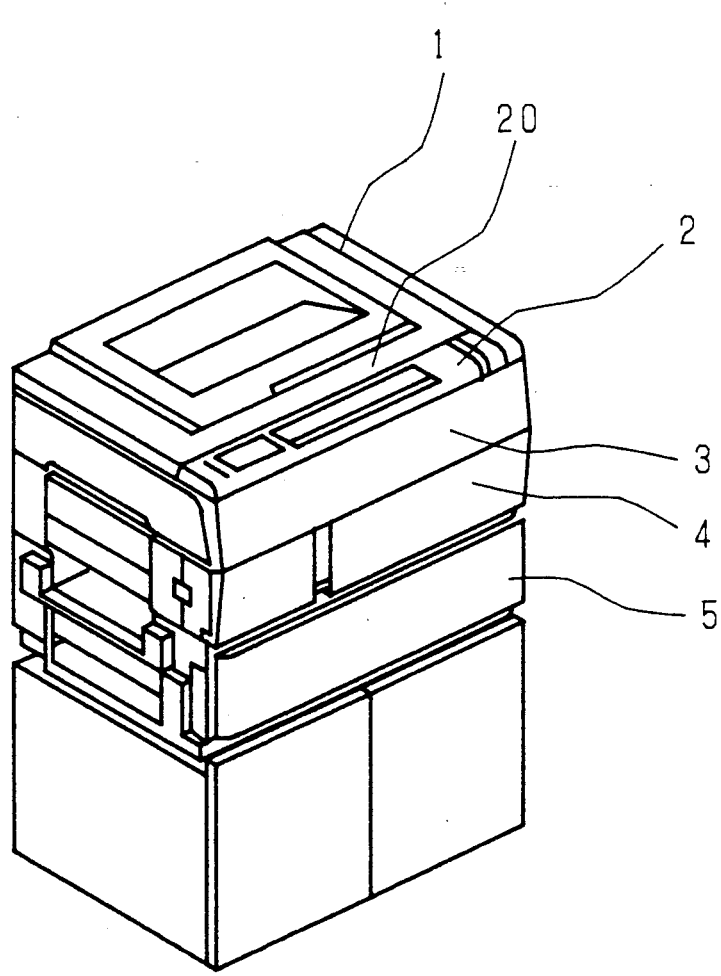
FIG. 1 is a perspective view showing an outer appearance of a copying machine equipped with a document scanning device according to the present invention.
Figure 2:
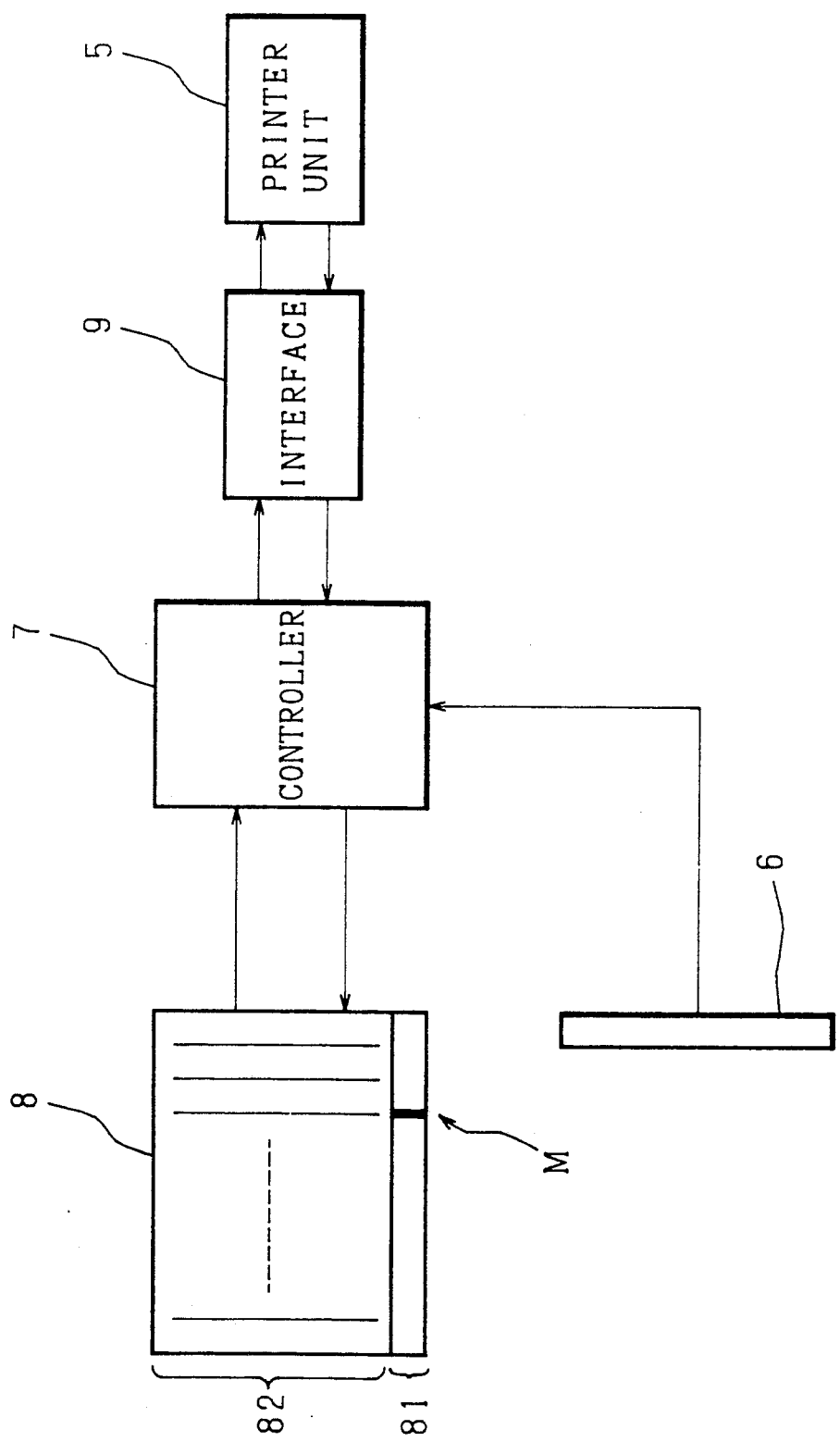
FIG. 2 is a block diagram of a control system.

FIG. 1 is a perspective view showing an outer appearance of a copying machine equipped with a document scanning device according to the present invention, and FIG. 2 is a block diagram of a control system of the copying machine. Referring to these FIGS. 1 and 2, references 1 and 3 represent respectively a document platen and an image reader unit. An operation panel 2 is provided laterally frontwardly of the document platen 1. Five position indicating levers as index means which will be described later are placed at a position 20 between the operation panel 2 and the document platen 1. These position indicating levers according to the present embodiment are used to designate a boundary between a necessary and an unnecessary areas of a document to be edited and copied. The image reader unit 3 raster-scans and reads the document with a built-in CCD 6 (referring to FIG. 2). The image data read by the CCD 6 is once temporarily stored in a memory 8 incorporated in an image memory unit 4 through a controller 7. Accordingly, only an image data in the necessary area designated by the position indicating lever is read from the memory 8. Thereafter, the image data is, through an interface 9, fed to a printer unit 5 to be copied onto a copy paper.

Figure 3:
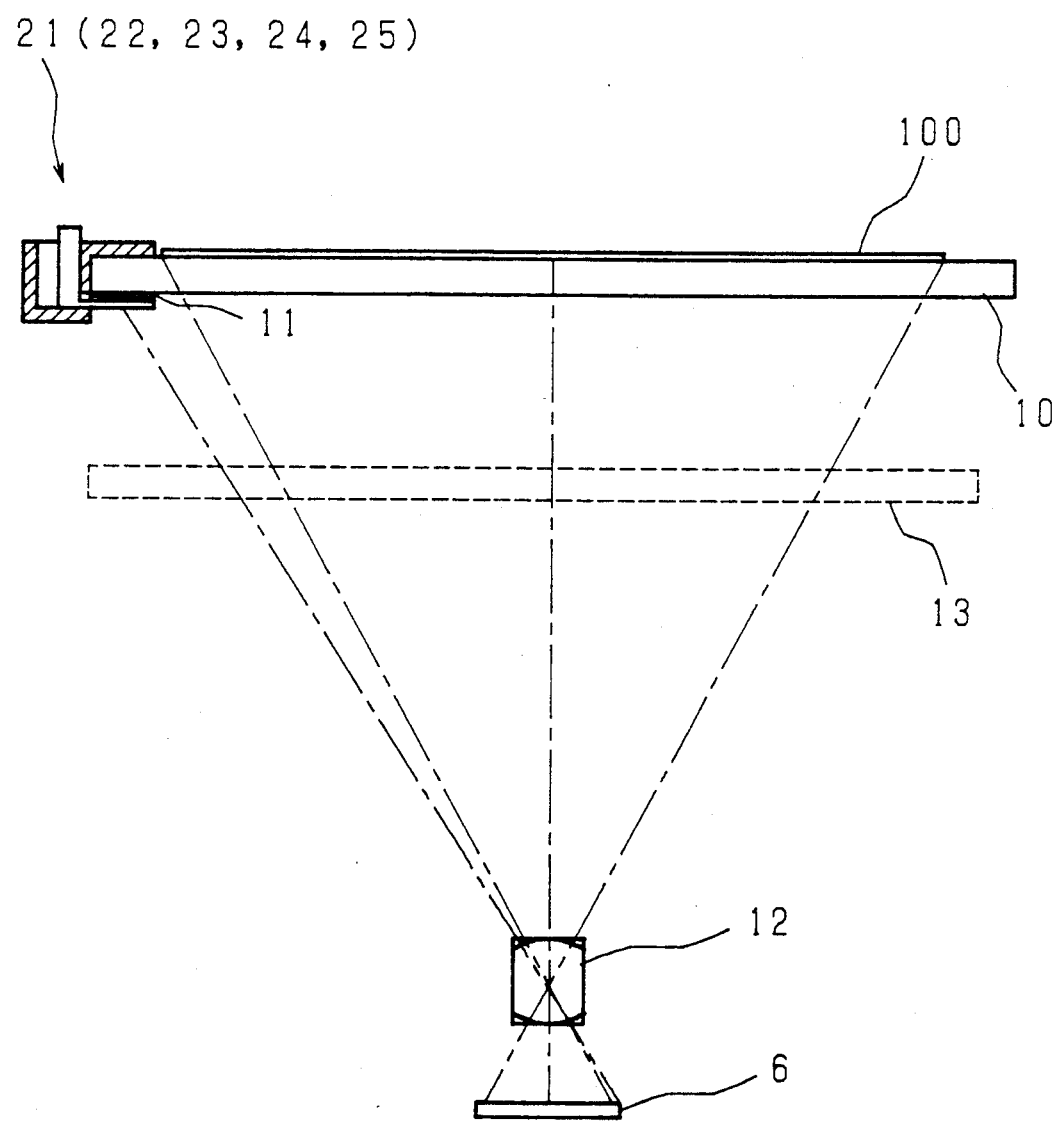
FIG. 3 is a diagram showing the relation among a document platen glass, position indicating lever and a CCD.
Figure 4:
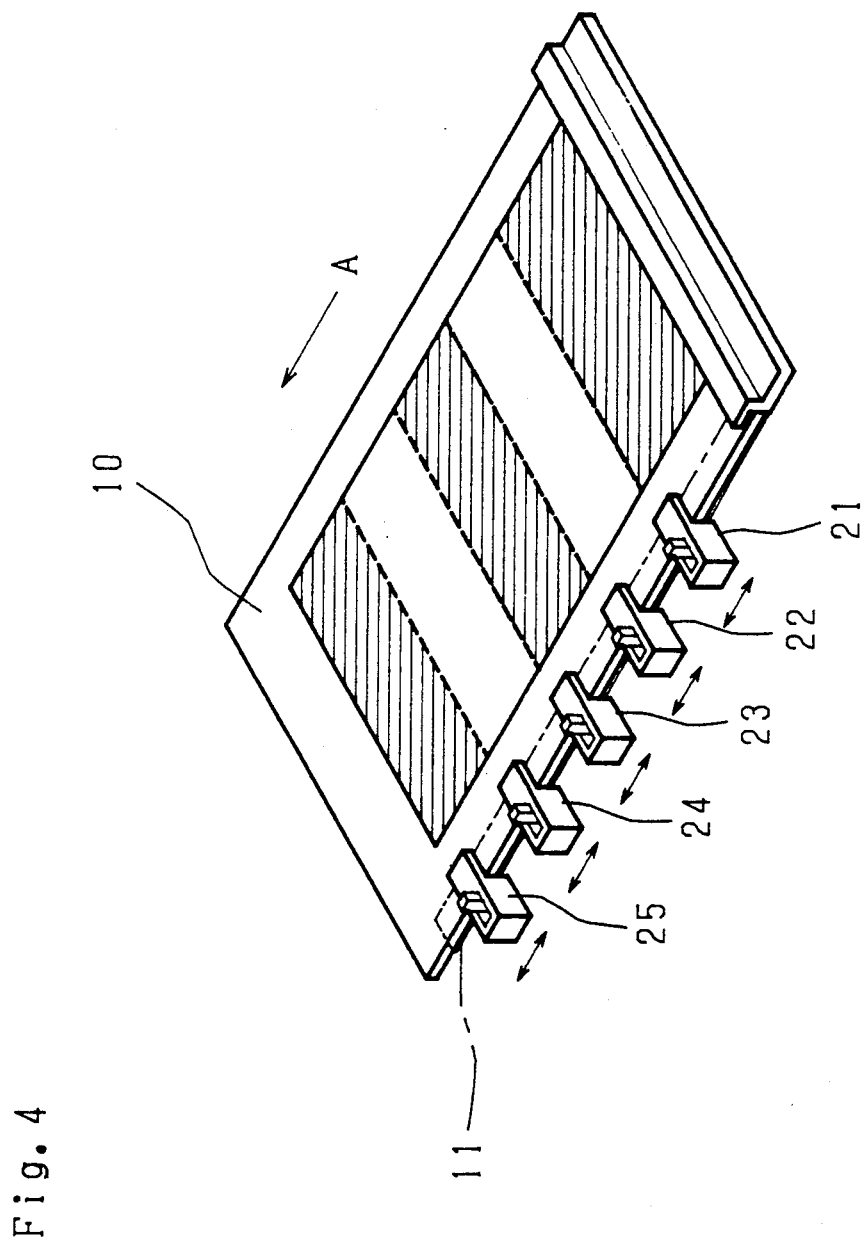
FIG. 4 is a perspective view showing surroundings of where the position indicating lever is mounted.

FIG. 3 illustrates the relation among a document platen glass, the position indicating lever and the CCD. A document 100 placed on a document platen glass 10 is scanned by a scanning means 13 including an exposure lamp and mirrors (schematically shown) and the image of the document 100 is formed onto the CCD 6 through a lens 12. At this time, the lower surface of the position indicating lever 21 (22, 23, 24, 25) provided frontwardly of the glass 10 is simultaneously scanned and the image of it is formed onto an edge portion of the CCD 6. As is best shown in FIG. 4, the five position indicating levers 21, 22, 23, 24 and 25 are so provided at a front edge portion of the glass 10 as to be partly engaged with the latter. Each of the position indicating levers 21, 22, 23, 24 and 25 is slidably moved along a sub-scanning direction A of the document. Moreover, a white tape 11 is attached all over the moving area of the position indicating levers 21, 22, 23, 24 and 25 at the lower surface of the lateral edge portion of the glass 10 engaged with the levers.

Figure 5:
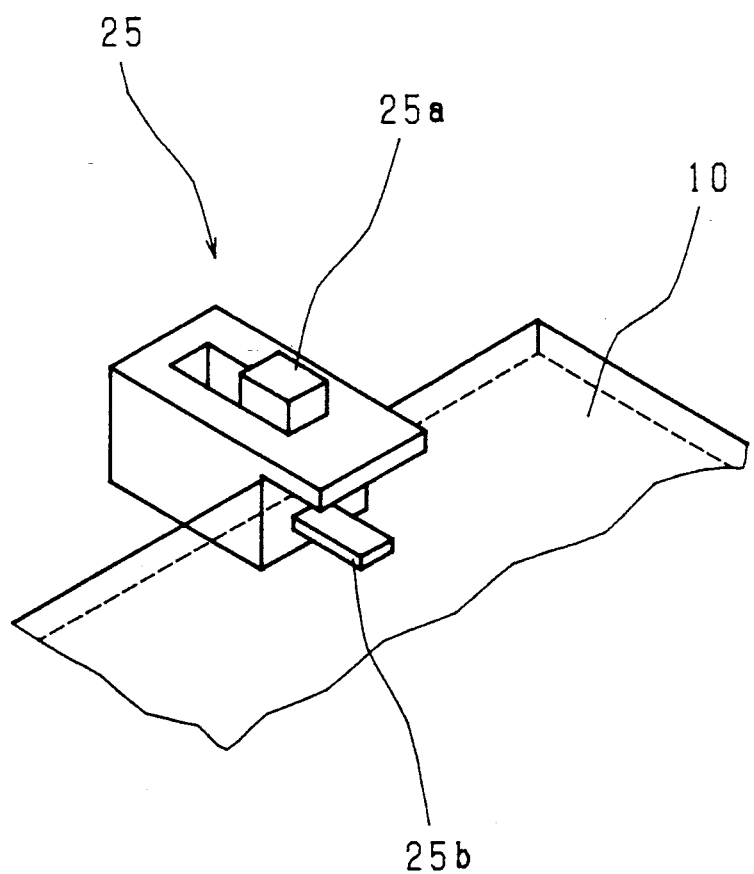
FIG. 5 is a perspective view of the position indicating lever.

Since the position indicating levers 21, 22, 23, 24 and 25 are all of the same structure, the structure of the position indicating lever 25 will be disclosed hereinbelow by way of example with reference to a perspective view of FIG. 5 and a side sectional view of FIG. 6. The position indicating lever 25 is provided with a marker moving lever 25a thereinside. The marker moving lever 25a is a switching member and movable in a direction orthogonal (main scanning direction of the document) to a moving direction of the position indicating lever 25 (sub-scanning direction of the document). The position indicating lever 25 is further provided with a marker 25b at a lower end of the marker moving lever 25a. The marker 25b is a member to be detected and is projected to the side of the document platen glass 10.

Figure 6A:
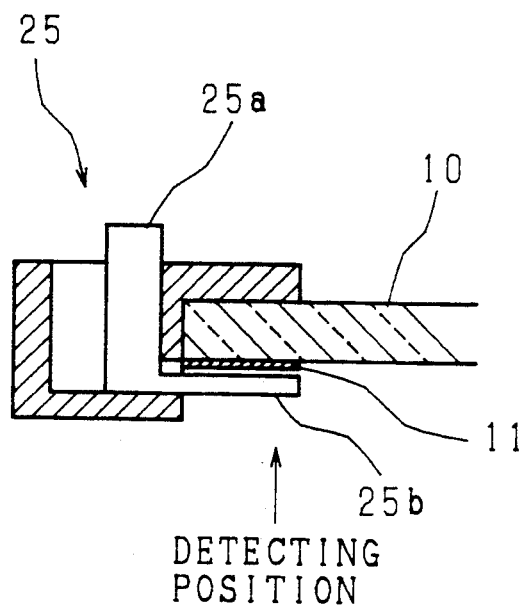
FIGS. 6(a) and 6(b) are side sectional views of the position indicating lever.
Figure 6B:
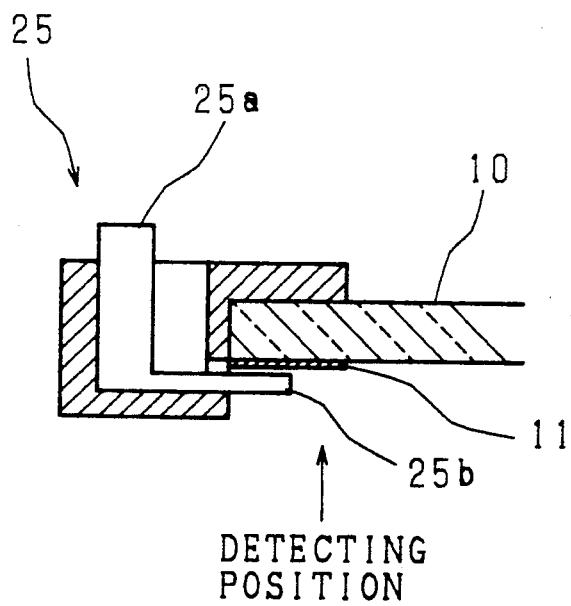

The lower surface of the member 25b is colored black. As indicated in FIGS. 5 and 6(a), in the case where the marker moving lever 25a is drawn closest to the document platen glass 10, the marker 25b comes to conceal the white tape 11 attached to the document platen glass 10. On the other hand, as indicated in FIG. 6(b), in the case where the marker moving lever 25a is drawn furthest to the opposite side, the white tape 11 at a position indicated by the position indicating lever 25 is exposed. In the event that the marker moving lever 25a is drawn closest to the document platen glass 10, the position indicating lever 25 is brought in a state to be detected by the CCD 6, whereby, as shown in FIG. 2, the marker 25b having a different reflectivity from the white tape 11 in the back is detected, e.g., at a position M within a marker detecting area 81 of the memory 8. Then, it is selected whether or not a scan starting end or a scan finishing end of the image data is to be copied while a boundary is set at a line corresponding to the position M within an image memory area 82. Thus, editing and copying of the document is executed.

How to set the position by the position indicating lever is not restricted to that the detecting area is set in the memory 8 and the position is detected by the CCD 6.

Figure 7:
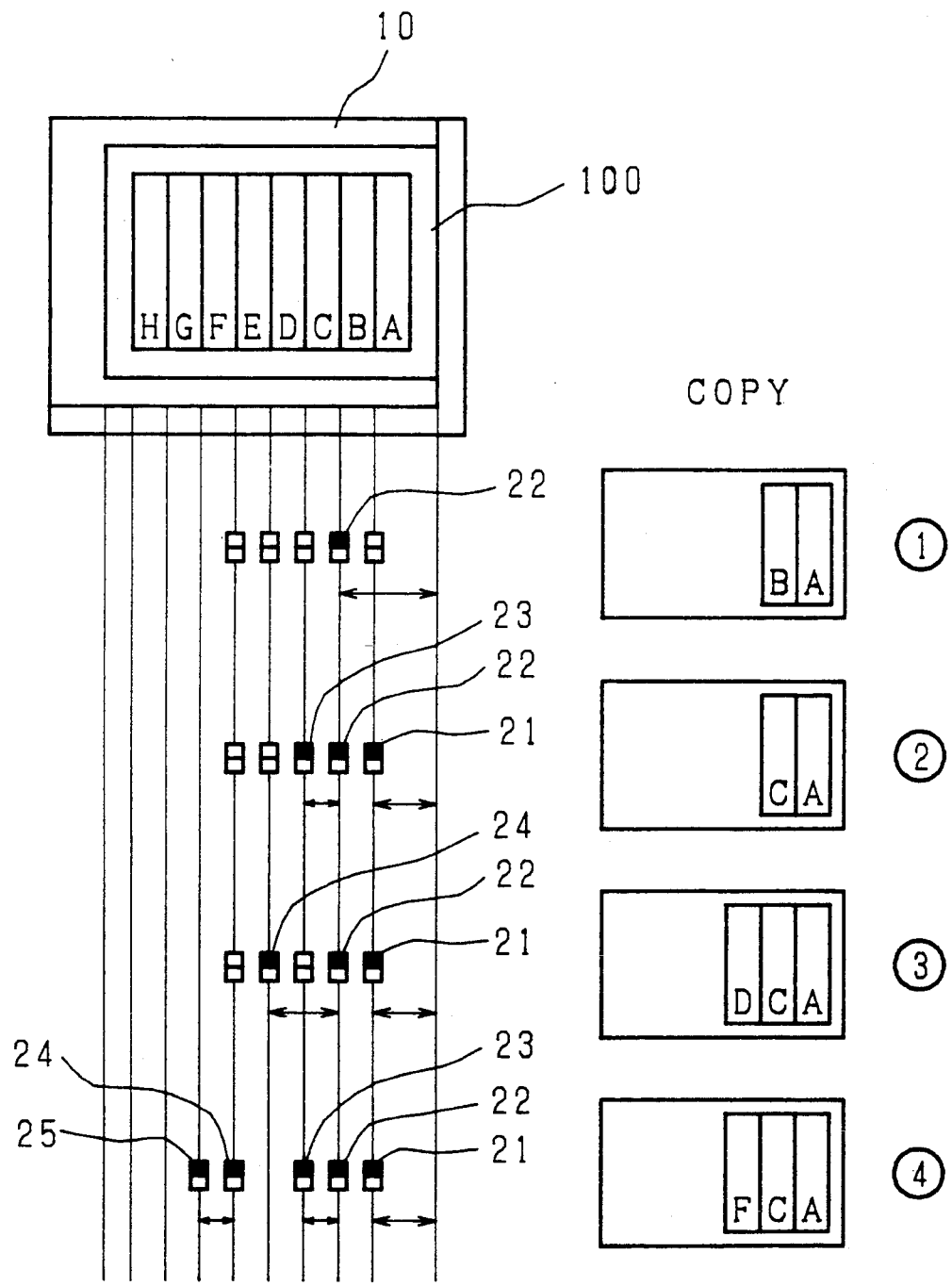
FIG. 7 is a diagram showing an example when a document is edited and copied with the use of the position indicating lever.

FIG. 7 shows a diagram of one example when the document is edited and copied by the use of the position indicating lever. By the use of the position indicating levers 21, 22, 23, 24 and 25, it becomes possible to extract and edit only a necessary column of the document 100 having a plurality of columns A-H, for example, when a list of addresses is to be copied. For a document written in a form supposed to be frequently copied, if the position indicating levers 21, 22, 23, 24 and 25 are set in advance at boundary positions of columns, and only a necessary position indicating lever is brought into the detecting state, copying can be achieved with good efficiency. According to the present embodiment, it is so arranged that an area from the scan starting end of the document to a position indicated by the position indicating lever first detected is copied, and a succeeding area from the above indicated position to a position indicated by a succeeding position indicating lever is not copied. The copying and non-copying areas are set alternately.

In the first place, in the case where a copy indicated by ① in FIG. 7 is desired, it is enough to turn only the position indicating lever 22 into the detectable state. Then, if a copy indicated by ② is to be obtained, because the position indicating lever 22 is already in the detectable state, only the position indicating levers 21 and 23 should be brought into the detectable state. This is also true of the copies ③ and ④. As for the copy ④, only the position indicating levers 24 and 25 should be moved, so that all of the position indicating levers are turned into the detectable state. It is to be noted here that five position indicating levers are provided according to this embodiment. However, an increase of the number of the position indicating levers will make the copy ④ easier through switching of the levers between the detectable and non-detectable state.

FIG. 8 is a side sectional view of a position indicating lever according to a second embodiment of the present invention. A position indicating lever 26 is so engaged with the document platen glass 10 as to sandwich a lateral edge portion of the glass 10 attached with the white tape 11, from up and down. The position indicating lever 26 is movable in the sub-scanning direction of the document. A lower power of the lever 26 where the glass 10 is clipped is formed as a marker 26c the lower surface of which is colored black. A moving lever 26a for moving a marker change plate 26b is provided within the position indicating lever 26 in a manner movable in the main scanning direction of the document, similar to the marker moving lever 25a according to the first embodiment. At a lower end of the moving lever 26a is provided the marker changing plate 26b having the lower surface thereof colored white. The marker changing plate 26b is moved below the marker 26c in association with the movement of the moving lever 26a.

Figure 8A:
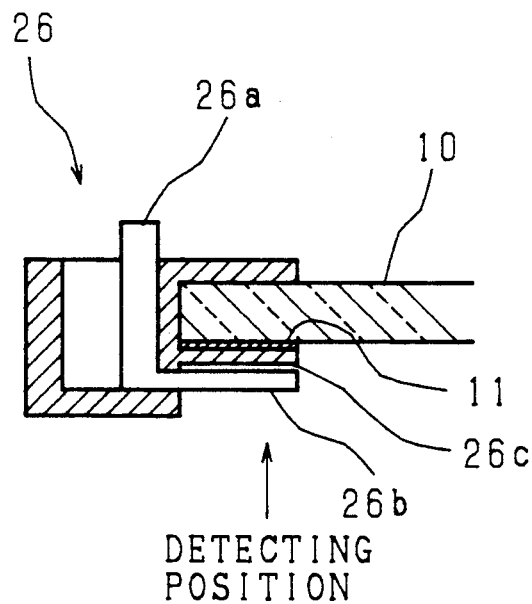
FIGS. 8(a) and 8(b) are side sectional views of the position indicating lever according to a second embodiment thereof.
Figure 8B:
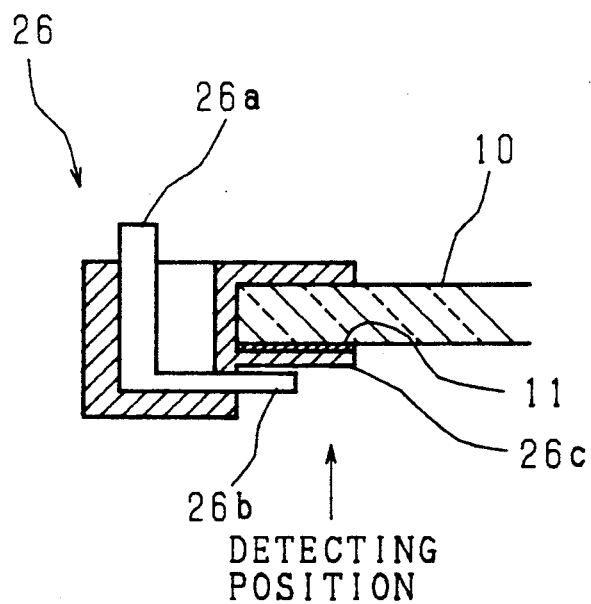

As seen from FIG. 8(a), when the moving lever 26a is drawn to the document platen glass 10, the marker changing plate 26b conceals the marker 26c, so that the marker 26c is not detected. The non-detectable state is thus set. On the other hand, as indicated in FIG. 8(b), when the moving lever 26a is drawn to the opposite side, the marker 26c is exposed. The detectable state is hence set. In the above-mentioned structure according to the second embodiment, the marker itself is not necessary to be moved when it is set in the detectable or non-detectable state. Therefore, the accuracy in indicating the position by the marker can be advantageously enhanced.

Figure 9:
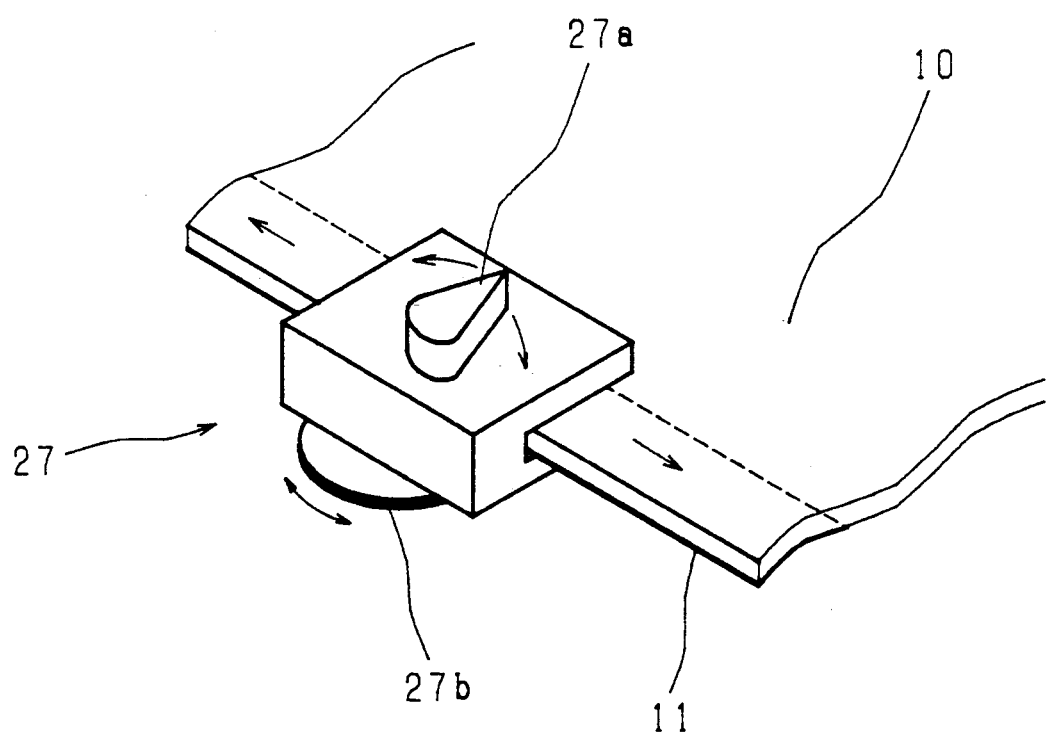
FIG. 9 is a side sectional view of the position indicating lever according to a third embodiment thereof.
Figure 10A:
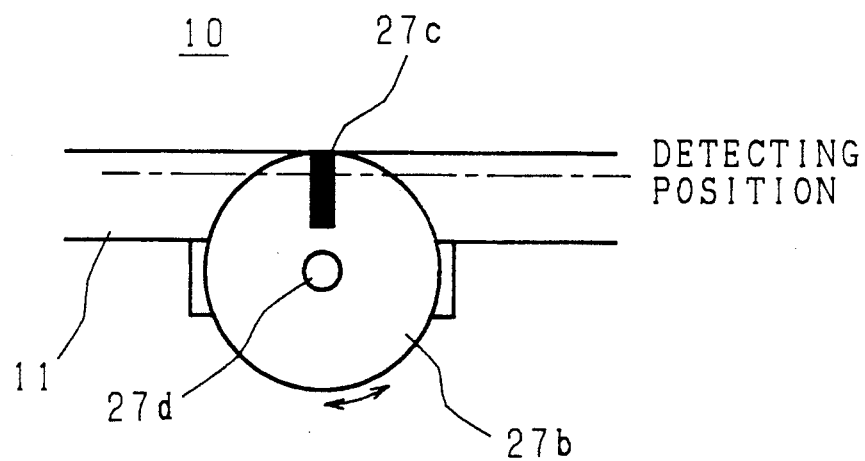
FIGS. 10(a) and 10(b) are views of the position indicating lever according to the third embodiment, seen from the bottom surface thereof.
Figure 10B:
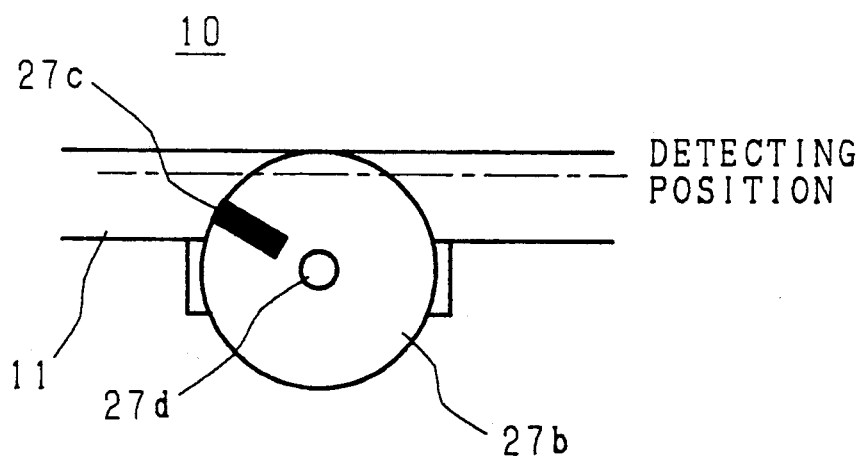

FIG. 9 is a perspective view of a position indicating lever according to a third embodiment of the present invention, and FIG. 10 is a plan view of the position indicating lever of FIG. 9 seen from the bottom surface thereof. A position indicating lever 27 of the third embodiment is so engaged with the document platen glass 10 as to sandwich from up and down a lateral edge portion of the glass 10 attached with the white tape 11. The position indicating lever 27 is movable in the sub-scanning direction of the document. A shaft 27d of the lever 27 is rotatably provided. A marker rotating lever 27a is fitted at an upper end of the shaft 27d, and a marker disk 27b is provided at a lower end of the shaft 27d. A black marker 27c shown in FIG. 10 is formed at a part of the lower surface of the marker disk 27b. Since the marker 27c of the marker disk 27b can be positioned in the detecting area or retracted from the detecting area by the rotation of the marker rotating lever 27a, it is easy to set the marker 27c in the detectable state or in the non-detectable state. In this case, the marker disk 27b may be made of transparent material.

In any of the foregoing embodiments, use is referred to the white tape and the black marker, but not restricted to those means. Any means may be employable so long as it assures a definite clear contract, for example, when a liquid crystal is used for the marker, the deflecting state thereof may be changed.

Moreover, in the above-discussed embodiments, the marker is detected by the utilization of the CCD of the digital-type copying machine which reads an image of document through conversion thereof into electric signals. However, the present invention is applicable also in an analog-type copying machine which is designed to guide a reflecting light reflected from an image of exposed document directly onto a photosensitive body by a reflecting mirror. In this case, the marker is detected by a sensor such as a photo-transistor or the like provided in a scanner scanning the document.

Although the position indicating lever is detected by the photoelectric CCD in the above-discussed embodiments, it may be done magnetically by a lead switch, etc. or mechanically by a microswitch, etc.

Furthermore, although the position indicating lever is movable in the sub-scanning direction in the foregoing embodiments, the present invention is applicable to such a position indicating lever that is movable in the main scanning direction.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A document scanning device comprising:
a platen for placing a document thereon;
a movable scanner for scanning said document;
index means provided at an edge portion of said platen in a movable manner in a scanning direction of said movable scanner for indicating a boundary between areas into which said document is divided in said scanning direction; and
detecting means for detecting the position of said boundary,
said index means including a member to be detected by said detecting means, and a switching member for switching, without being longitudinally moved with respect to said document, said member to be detected between a detectable state wherein said member to be detected is detectable by said detecting means and a non-detectable state wherein said member to be detected is not detectable by said detecting means.

2. A document scanning device as claimed in claim 1, wherein said detecting means includes a photoelectric conversion element for detecting the difference in density between said member to be detected and said edge portion of platen.

3. A document scanning device as claimed in claim 2, wherein said detecting means is a linear image sensor to read an image of said document.

4. A document scanning device as claimed in claim 2, wherein said switching member moves said member to be detected in a movable manner to and from an optical path of said detecting means.

5. A document scanning device as claimed in claim 4, wherein said member to be detected is in the detectable state by said detecting means when said member to be detected is in said optical path.

6. A document scanning device as claimed in claim 2, wherein said switching member conceals said member to be detected from said detecting means.

7. A document scanning device as claimed in claim 1, wherein said edge portion of platen confronting said detecting means is colored with a first color, while said member to be detected is colored with a second color distinguishable from said first color.

8. A document scanning device as claimed in claim 7, wherein said first color is white, and said second color is black.

9. A document scanning device for scanning a document placed on a platen, said device comprising:
index means provided movably at an edge portion of said platen and adapted to indicate a boundary between areas into which said documents divided; and
detecting means for detecting the position of said boundary;
said index means including a member to be detected by said detecting means, and a switching member for switching, without being longitudinally moved with respect to said document, said member to be detected between a detectable state wherein said member to be detected is detectable by said detecting means and a non-detectable state wherein said member to be detected is not detectable by said detecting means.

10. A document scanning device as claimed in claim 9, wherein said detecting means includes a photoelectric conversion element for detecting the difference in density between said member to be detected and said edge portion of platen.

11. A document scanning device as claimed in claim 10, wherein said switching member moves said member to be detected in a movable manner to and from an optical path of said detecting means.

12. A document scanning device as claimed in claim 11, wherein said member to be detected is in the detectable state by said detecting means when said member to be detected is in said optical path.

13. A document scanning device as claimed in claim 10, wherein said switching member conceals said member to be detected from said detecting means.

14. A document scanning device as claimed in claim 9, further comprising a white tape attached to said edge portion of platen.

15. A document scanning device as claimed in claim 9, wherein said member to be detected is black.

* * * * *